United States Patent
Luo et al.

(10) Patent No.: US 11,363,568 B2
(45) Date of Patent: Jun. 14, 2022

(54) RESOURCE SELECTION METHOD AND APPARATUS FOR DEVICE-TO-DEVICE/VEHICLE-TO-EVERYTHING COMMUNICATION SUPPORTING CARRIER AGGREGATION

(71) Applicant: Huizhou TCL Mobile Communication Co., Ltd., Hui Zhou (CN)

(72) Inventors: Yaming Luo, Hui Zhou (CN); Xiang Chen, Hui Zhou (CN); Eddy Chiu, Hui Zhou (CN)

(73) Assignee: HUIZHOU TCL MOBILE COMMUNICATION CO., LTD., Hui Zhou (CN)

( * ) Notice: Subject to any disclaimer, the term of this patent is extended or adjusted under 35 U.S.C. 154(b) by 41 days.

(21) Appl. No.: 16/638,732

(22) PCT Filed: Nov. 28, 2017

(86) PCT No.: PCT/CN2017/113303
§ 371 (c)(1),
(2) Date: Feb. 12, 2020

(87) PCT Pub. No.: WO2019/033609
PCT Pub. Date: Feb. 21, 2019

(65) Prior Publication Data
US 2020/0187162 A1 Jun. 11, 2020

(30) Foreign Application Priority Data
Aug. 12, 2017 (CN) .................. 201710688457.X

(51) Int. Cl.
*H04W 72/02* (2009.01)
*H04W 72/04* (2009.01)
*H04W 72/08* (2009.01)

(52) U.S. Cl.
CPC ......... *H04W 72/02* (2013.01); *H04W 72/044* (2013.01); *H04W 72/085* (2013.01)

(58) Field of Classification Search
CPC .................................................. H04W 72/02
See application file for complete search history.

(56) References Cited

U.S. PATENT DOCUMENTS

| | | | |
|---|---|---|---|
| 9,559,816 | B2 | 1/2017 | Axmon et al. |
| 2016/0226634 | A1 | 8/2016 | Axmon et al. |

(Continued)

FOREIGN PATENT DOCUMENTS

| | | |
|---|---|---|
| CN | 106664183 A | 5/2017 |
| WO | 2017078477 A1 | 5/2017 |

OTHER PUBLICATIONS

Qualcomm Incorporated, Details of Sensing Using Autonomous Resource Selection for V2V, meeting, Aug. 31, 2016, all, R1-166257, 3GPP TSG-RAN WG1 #86, Gothenburg, Sweden.

(Continued)

*Primary Examiner* — Edan Orgad
*Assistant Examiner* — Won Tae C Kim
(74) *Attorney, Agent, or Firm* — Hamre, Schumann, Mueller & Larson, P.C.

(57) ABSTRACT

A resource selection method and apparatus for device-to-device/vehicle-to-everything communication supporting carrier aggregation are disclosed. The resource selection method includes: initializing at least two resource pools, wherein each resource pool corresponds to one carrier; excluding an expected-busy resource from each resource pool associated with a resource of which channel signal strength is greater than a comparison threshold during a sensing period; determining whether remaining resources of a candidate resource pool meet a criterion for stopping resource exclusion, wherein the candidate resource pool (Continued)

comprises a portion of or all the resource pools, and the criterion comprises that a criteria parameter of the candidate resource pool is greater than or equal to a preset threshold of the criteria parameter; selecting a resource subset from the remaining resources of the candidate resource pool when the criterion is met, and otherwise incrementing the comparison threshold.

18 Claims, 7 Drawing Sheets

(56) References Cited

U.S. PATENT DOCUMENTS

| | | | |
|---|---|---|---|
| 2019/0075547 A1 | 3/2019 | Chae et al. | |
| 2019/0313279 A1* | 10/2019 | Li | H04W 28/0289 |
| 2020/0015176 A1* | 1/2020 | Li | H04L 5/0082 |

OTHER PUBLICATIONS

LG Electronics, Sensing Details for UE Autonomous Resource Selection Mode in PC5-based V2V, meeting, Aug. 31, 2016, all, R1-166825, 3GPP TSG-RAN WG1 Meeting #86, Gothenburg, Sweden.

Intel Corporation, Sidelink carrier aggregation for LTE V2V communication, meeting, May 15-19, 2017, all, R1-1707300, 3GPP TSG-RAN WG1 Meeting #89, Hangzhou.

Huawei et al, Discussion on RRM measurements related to UE autonomous resource selection in V2V, meeting, Oct. 10-14, 2016, all, R1-167770, 3GPP TSG-RAN WG4 Meeting #80bis, Ljubljana, Slovenia.

NTT Docomo et al, Further details of UE autonomous resource (re)selection for V2V, meeting, Aug. 22-26, 2016, all, R1-167355, 3GPP TSG-RAN WG1 Meeting #86, Gothenburg, Sweden.

CATT, Further discussion on resource allocation mechanism in PC5-based V2V, meeting, Nov. 15-22, 2015, all, R1-156605, 3GPP TSG RAN WG1 Meeting #83bis, Anaheim, USA.

* cited by examiner

RESOURCE SELECTION METHOD AND APPARATUS FOR DEVICE-TO-DEVICE/VEHICLE-TO-EVERYTHING COMMUNICATION SUPPORTING CARRIER AGGREGATION

TECHNICAL FIELD

Embodiments of the present disclosure generally relate to communication technology, and in particular relate to a resource selection method and apparatus for device-to-device/vehicle-to-everything communication supporting carrier aggregation.

BACKGROUND

In generalized device-to-device communication systems (including a vehicle-to-everything (for abbreviation: V2X) system, which is enhanced version of the narrow-sense device-to-device systems), there may be no base stations to schedule a sidelink transmission between user equipments (for abbreviation: UE), and the UEs has to perform resource selection autonomously to select resources for sidelink transmission. In this transmission mode, Semi-Persistent Scheduling (for abbreviation: SPS) is always adopted. After the SPS is activated, the UE will use allocated resources for data transmission at a SPS periodicity. Thus, if one resource is utilized for data transmission, it is possible that some future resources arranged in a given periodicity will be reserved for data transmission of the UE.

The SPS enables the UE to perform prediction of future channel occupation status based on the monitored channel occupation status in the history. As illustrated in FIG. 1, at subframe n, UE performs a prediction of future channel busy status for a resource pool. The prediction is based on history information in a sensing period (ranging from subframe n-a to subframe n-b), except for those in which UE's own transmissions occur. In the sensing period, besides the moment for its own data transmission, the UE needs to decode sidelink control information (for abbreviation: SCI) from physical sidelink control channels (for abbreviation: PSSCH) to determine a location of respective PSSCH, and measure demodulation reference signals (for abbreviation: DMRS) of the PSSCH to acquire a PSSCH reference signal receiving power (for abbreviation: RSRP).

The basic granularity of both the sensing period and the resource pool is a subframe in the time domain, and a sub-channel in the frequency domain. Each resource from the resource pool occupies one subframe in the time domain, and occupies L contiguous sub-channels in the frequency domain, where L is an integer. As the SPS is adopted, each resource from the resource pool is probably associated with some resources arranged periodically during the sensing period. The association information between the resource pool and resources during the sensing period may be derived from the decoded SCI.

In the prior art, the UE may select a resource subset for sidelink transmission from the resource pool according to status of the predicated future channels. That is, the UE perform a resource selection. Specifically, the UE excludes resources related to unmonitored subframes and related resources of which PSSCH-RSRP is larger than a threshold from the resource pool. If the number $S_A$ of all the remaining resources in the resource pool after excluding is greater than 20% of the total number $M_{total}$ of resources in the resource pool, (20%*$M_{total}$) resources is selected from the remaining resources as the resource subset, where the (20%*$M_{total}$) resources have the smallest sidelink-received signal strength indicator (for abbreviation: S-RSSI). Otherwise, the threshold is increased by 3 dBs and the above process is repeated until the resource subset is selected successfully.

In some existing device to device communication systems such as V2X, carrier aggregation is not supported. Accordingly, there is regarding one carrier when resource selection is performed. However, starting from the Release 15, it is proposed by 3GPP to apply the carrier aggregation technology to the V2V communication system. Parallel transmission may be performed on at least two carriers to support wider transmission bandwidth.

In this case, UE may select resources for a plurality of carriers at the same time. If the above existing resource selection is simply applied to each carrier, the final resource subset may be not appropriate since each carrier doesn't have same channel use status (such as channel busy level, interface level, a number of available resources, etc.).

SUMMARY

The technical problem to be solved by the present disclosure is to provide a resource selection method and apparatus for device-to-device/vehicle-to-everything communication supporting carrier aggregation, such that the problem in the prior art may be solved, in which the resource subset obtained by performing resource selection for a plurality of carriers by the UE itself may be not appropriate.

In order to solve the above-mentioned problems, in accordance with a first aspect, the present disclosure provides a resource selection method, and the method includes: initializing at least two resource pools, wherein each resource pool corresponds to one carrier; excluding an expected-busy resource from each resource pool associated with a resource of which channel signal strength is greater than a comparison threshold during a sensing period; determining whether remaining resources of a candidate resource pool meet a criterion for stopping resource exclusion, wherein the candidate resource pool comprises a portion of or all the resource pools, and the criterion comprises that a criteria parameter of the candidate resource pool is greater than or equal to a preset threshold of the criteria parameter; and selecting a resource subset from the remaining resources of the candidate resource pool when the criterion is met, and otherwise incrementing the comparison threshold to repeatedly execute excluding expected-busy resources from each resource pool.

In order to solve the above-mentioned problems, in accordance with a second aspect, the present disclosure provides a resource selection apparatus, and the apparatus includes a processor and a communication circuit, wherein the processor is connected to the communication circuit, and the processor is configured for executing programs to perform the method provided by the first aspect.

In order to solve the above-mentioned problems, in accordance with a third aspect, the present disclosure provides an apparatus, and the apparatus includes a memory which storing programs. The programs are executed to perform the method provided by the first aspect.

The subsequent advantages of the present disclosure may be achieved: in the process of checking whether all remaining resources in the candidate resource pool meet the criterion for stopping the resource exclusion, all the resource pools in the candidate resource pool is entirely treated, and its criteria parameter is compared with the preset threshold. Compared with respectively-checking for the resource pool of each carrier in the prior art, the checking result whether or not to stop the resource exclusion becomes more accurate, the carrier selection and the following resource subset selection are more accurate as they are directly based on the exact sensing result, and the effect which the difference of channel utilization status for different carriers has on the remaining resources is reduced after the resource exclusion. Therefore, the selected resource subset is more appropriate.

DETAILED DESCRIPTION

Figure 2:
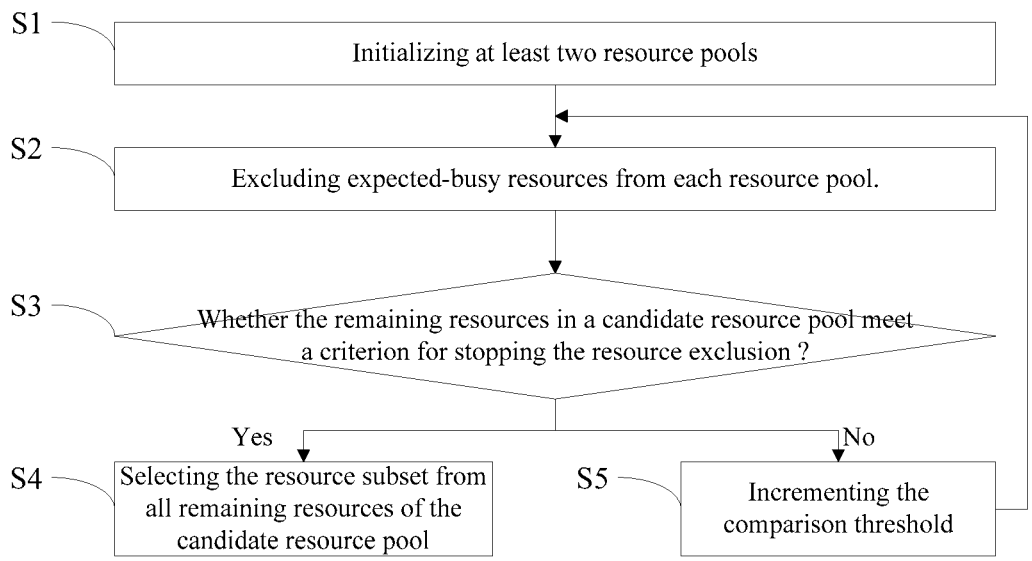
FIG. 2 illustrates a flow chart of a resource selection method for device-to-device/vehicle-to-everything communication supporting carrier aggregation according to a first embodiment of the present disclosure.

The execution subject, which executes a resource selection method for device-to-device/vehicle-to-everything communication supporting carrier aggregation according to a first embodiment of the present disclosure, may be a user equipment (UE). The user equipment may be fixed. Also, it may be a mobile device, such as cellular phone, personal digital assistant (PDA), wireless modem, tablet PC, laptop, cordless phone, vehicle terminal, vehicle, etc. As shown in FIG. 2, the resource selection method may include the following blocks in this embodiment.

In block S1: the UE initializes at least two resource pools.

Figure 1:
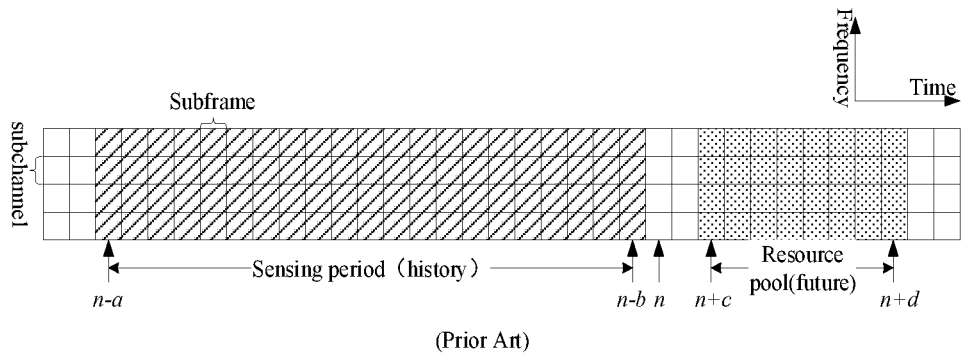
FIG. 1 illustrates a diagram of the resource pool and the sensing period in the prior art.

Each resource pool corresponds to a carrier in the frequency domain, and an interval (i.e. the interval from subframe n+c to subframe n+d as shown in FIG. 1) in the time domain during which the UE predicts a future channel busy status. [c, d] is a time window to which a resource pool corresponds, where both c and d are integers and c<d. d is an endpoint of the time window, which will meet a latency requirement for to-be-transmitted data. For same data services, the time windows corresponding to resource pools for different carriers have same endpoints. In other word, for same data services, values of d are fixed, and values of c may be same or different.

The initialized resource pools may include all resources. The total number of the resource pools or carriers is K. For the $k^{th}$ resource pool, it has $M_k$ resources. In other words, the number of resources when the $k^{th}$ resource pool is initialized is $M_k$, where k=1, 2, . . . , K.

In block S2: the UE excludes expected-busy resources from each resource pool.

The expected-busy resources are related to resources of which channel signal strength is larger than a comparison threshold during a sensing period. The channel signal strength may be at least one of the RSRP of PSSCH, the received signal strength indicator (RSSI) and the signal to interference noise ratio (SINR). A resource, of which channel signal strength is larger than the comparison threshold during a sensing period, indicates that another device may perform data transmission using the resource. As the SPS is adopted, resources related to this resource in a resource pool, which are referred as the expected-busy resources, may also be occupied. Thus those resources are needed to be excluded out a resource subset.

For the $k^{th}$ resource pool, after resource exclusion, it has $N_k$ remaining resources. The higher the comparison threshold is, the smaller a number of excluded resources is, then larger $N_k$ is. In other words, the number of remaining resources is positively related to the comparison threshold. This does not mean that the number of remaining resources must increase as the comparison threshold increases. As the channel signal strength is not always continuously distributed during the sensing period, the actual number of remaining resources may also maintain unchanged as the comparison threshold increases.

An initial value of the comparison threshold may be determined before the block S2, which will be described in subsequent embodiments.

In block S3: the UE checks whether the remaining resources in a candidate resource pool meet a criterion for stopping the resource exclusion.

Assume that the base number of the candidate resource pool S is s. In other word, the candidate resource pool S is composed of s resource pools. s is a positive integer which is less than or equal to K. That is to say, the candidate resource pool S includes a part of the resource pools or all the resource pools.

In one approach, the UE can directly use all the resource pools as the candidate resource pool. In another approach, the UE can also add a resource pool each time into the candidate resource pool and then check whether the remaining resources in the updated candidate resource pool meet the criterion for stopping the resource exclusion, which will be described in the following embodiments. Compared with the previous approach, in the latter approach, the base number s of the candidate resource pool may be smaller so that the number of carriers corresponding to resources in the resource subset may be less.

The criterion for stopping the resource exclusion, which is referred to as the stopping criterion hereinafter, may include an entire criterion. The entire criterion means that a criteria parameter of the candidate resource pool is greater than or equal to a preset threshold of the criteria parameter. The criteria parameter may be a number and/or an occupancy proportion of all remaining resources in a corresponding resource pool set. The occupancy proportion of all remaining resources is a ratio between the number of all remaining resources and the total number of resources in the corresponding resource pool set. The resource pool set includes at least one resource pool. The corresponding resource pool set is treated in its entirety in the process to calculate the criteria parameter. For example, a resource pool set X includes x resource pools, and x is an integer greater than or equal to 1. The total number of resources in the $y^{th}$ resource pool is $M_y$, the number of the remaining resources in the $y^{th}$ resource pool is $N_y$, and y=1, . . . , x. The criteria parameter of the resource pool set X includes the number of all remaining resources $$\left(\text{i.e. } \sum_{y=1}^{x} N_y\right)$$

and/or the occupancy proportion of all remaining resources $$\left(\text{i.e. } \frac{\sum_{y=1}^{x} N_y}{\sum_{y=1}^{x} M_y}\right).$$

Thus, it is derived in a similar way that the criteria parameter of the candidate resource pool includes $$\sum_{k \in S} N_k$$

(i.e. the number of all remaining resources) and/or $$\frac{\sum_{k \in S} N_k}{\sum_{k \in S} M_k}$$

(i.e. the occupancy proportion of all remaining resources).

If the criteria parameter is the number of the remaining resources, and the preset threshold of the number is $N^s$, the entire criterion may include as follows.

$$\sum_{k \in S} N_k \geq N^s.$$

If the criteria parameter is the occupancy proportion of all remaining resources, and the preset threshold of the occupancy proportion is $r^s$, the entire criterion may include as follows.

$$\frac{\sum_{k \in S} N_k}{\sum_{k \in S} M_k} \geq r^s.$$

$N^s$ and $r^s$ are constants having nothing with the value of s. In other words, $N^s$ and $r^s$ don't vary as s varies. In another embodiment, $N^s$ and $r^s$ may be variables associated with s. That is to say, $N^s$ and $r^s$ vary as s varies.

In one embodiment of the present disclosure, the preset threshold $N^s$ of the number is a constant which has nothing with the value of s, a value of which is 20% the sum of the total numbers of resources of all the initialized resource pools. That is to say, the value of the preset threshold N is derived as follows.

$$20\% * \sum_{k=1}^{K} M_k.$$

If the stopping criterion is met, then block S4 is performed. And if the stopping criterion isn't met, it means that the remaining resources in the candidate resource pool are not enough to select the resource subset, and it is needed to make that there are more remaining resources in the candidate resource pool. As the number of the remaining resources in each resource pool is positively related with the comparison threshold, the comparison threshold is needed to be increased. Then block S5 is performed.

In the block S4: the UE selects the resource subset from all remaining resources of the candidate resource pool.

The resource subset may be used for sidelink transmission in the V2X, or other device-to-device communication systems supporting the carrier aggregation. The process terminates.

In the block S5: the UE increments the comparison threshold.

A single increment value of the comparison threshold may be a constant, such as 3 dB. For another example, the single increment value of the comparison threshold may be a variable.

Then the block S2 is performed again, and the blocks after the block S2 is performed again, until the resource subset is selected successfully.

With the implementation of the above embodiment, in the process of checking whether all remaining resources in the candidate resource pool meet the criterion for stopping the resource exclusion, all the resource pools in the candidate resource pool is treated as a whole, and its criteria parameter is compared with the preset threshold. Compared with respectively-checking for the resource pool of each carrier in the prior art, the checking result whether or not to stop the resource exclusion becomes more accurate, the carrier selection and the following resource subset selection are more accurate as they are directly based on the exact sensing result, and the effect which the difference of channel utilization status for different carriers has on the remaining resources is reduced after the resource exclusion. Therefore, the selected resource subset is more appropriate.

In one example, the channel signal strength is PSSCH-RSRP. The total number of resources for both the resource pool for the carrier A and the resource pool for the carrier B is 100 respectively, and the initial values of the comparison threshold for both the carrier A and the carrier B are same. The channel occupancy rate of the carrier A is low, and the number of the remaining resources is 36 in the case where the comparison threshold is the initial value. The channel occupancy rate of the carrier B is high, and the number of the remaining resources is 6 in the case where the comparison threshold is the initial value. If the existing scheme is used, the resource subset of the carrier A can be selected as the number of the remaining resources for the carrier A is greater than 20 which equals to 100*20%, while the comparison threshold for the carrier B needs to be adjusted. Assume that the number of the remaining resources for the carrier B becomes 24 after the comparison threshold has been adjusted twice. Then the resource subset of the carrier B can be selected. Therefore, the final selected resource pool subset includes the resource subset of the carrier A and the resource subset of the carrier B, where the PSSCH-RSRP of resources during the sensing period associated with resources for the carrier B has a larger probability than that for the carrier A. It means that the future channels of resources for the carrier B has larger probability to be in busy state than that for the carrier A. Even it has larger probability than that of resources of the carrier A which are not selected into the resource subset. As such, the selected resource pool is not accurate. However, if the aforementioned scheme is applied, the remaining resources of the carrier A and the remaining resources of the carrier B are treated as a whole, then the total number of all the remaining resources is 42 which equals to 36+6, in the case that the comparison threshold is the initial value. Since 42 is greater than 40 which equals to 2*100*20%, the comparison threshold doesn't need to be adjusted and the resource subset can be selected, omitting some unnecessary adjustment of the comparison threshold. The overall future channels of the selected resource subset have obviously smaller probability to be in busy state than that in the prior art, and the accuracy of the selected resource subset is improved, and the interference between the UE with the more accurate resource subset and other UEs is reduced.

Figure 3:
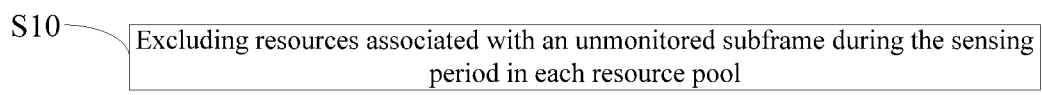
FIG. 3 illustrates a flow chart of a resource selection method for device-to-device/vehicle-to-everything communication supporting carrier aggregation according to a second embodiment of the present disclosure.

FIG. 3 illustrates a flow chart of a resource selection method for device-to-device/vehicle-to-everything communication supporting carrier aggregation according to a second embodiment of the present disclosure, which is based on that in the first embodiment. As shown in FIG. 3, the method includes the following block before the block S2.

In block S10: the UE excludes resources associated with an unmonitored subframe during the sensing period in each resource pool.

The unmonitored subframe means a subframe through which the UE transmits its own data during the sensing period. As the UE is in transmitting state on the subframe, it cannot receive PSCCH and PSSCH. When the UE may work in a full-duplex state, or the UE doesn't transmit data during the sensing period, the block S10 may be omitted.

Figure 4:
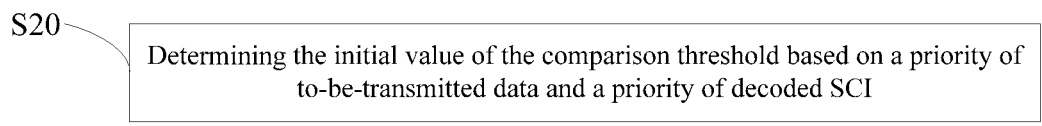
FIG. 4 illustrates a flow chart of a resource selection method for device-to-device/vehicle-to-everything communication supporting carrier aggregation according to a third embodiment of the present disclosure.

FIG. 4 is a flow chart of a resource selection method for device-to-device/vehicle-to-everything communication supporting carrier aggregation according to a third embodiment of the present disclosure, which is based on that in the first embodiment. As shown in FIG. 4, the method further includes the following block before the block S2.

In block S20: the UE determines the initial value of the comparison threshold based on a priority of to-be-transmitted data and a priority of decoded sidelink control information (SCI).

The initial value of the comparison threshold may be a value indicated by the $i^{th}$ SL-ThresPSSCH-RSRP domain in the SL-ThresPSSCH-RSRP-List-r14, where i=Prio_Tx*8+Prio_Rx+1, Prio_Tx is the priority of the to-be-transmitted data, and Prio_Rx is the priority of the decoded SCI. The initial values of the comparison threshold for different resources may be either same or different.

Figure 5:
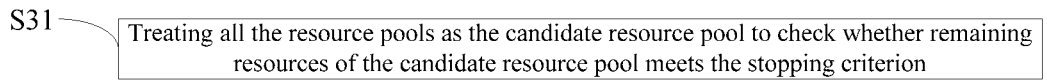
FIG. 5 illustrates a flow chart of a resource selection method for device-to-device/vehicle-to-everything communication supporting carrier aggregation according to a fourth embodiment of the present disclosure.

FIG. 5 is a flow chart of a resource selection method for device-to-device/vehicle-to-everything communication supporting carrier aggregation according to a fourth embodiment of the present disclosure, which is based on that in the first embodiment. As shown in FIG. 5, the block S3 includes the following block.

In block S31: the UE treats all the resource pools as the candidate resource pool to check whether remaining resources of the candidate resource pool meet the stopping criterion.

The UE may directly treat all the resource pools as an entirety to first calculate a criteria parameter thereof and then compare the calculated result with the preset threshold.

Figure 6:
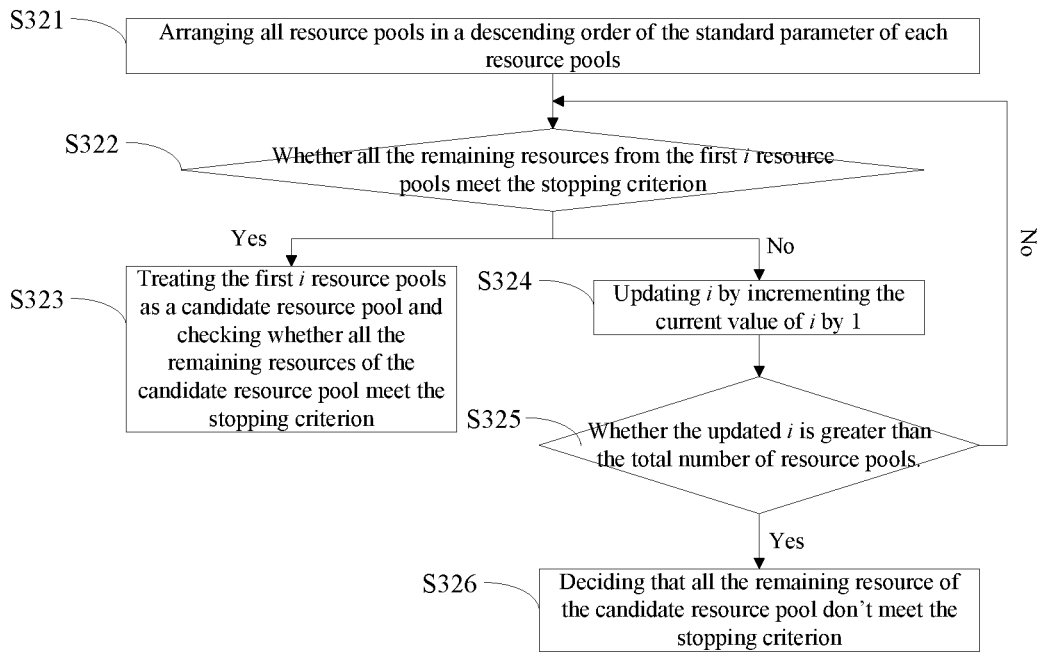
FIG. 6 illustrates a flow chart of a resource selection method for device-to-device/vehicle-to-everything communication supporting carrier aggregation according to a fifth embodiment of the present disclosure.

FIG. 6 is a flow chart of a resource selection method for device-to-device/vehicle-to-everything communication supporting carrier aggregation according to a fifth embodiment of the present disclosure, which is based on that in the first embodiment. In this embodiment, the candidate resource pool is increased successively and whether the remaining resources of the increased candidate resource pool meet the stopping criterion is checked. At this time, as shown in FIG. 6, the block S3 includes the following blocks.

In block S321: the UE arranges all resource pools in a descending order of the criteria parameter of each resource pools.

A resource pool with a larger criteria parameter has larger probability to meet the stopping criterion. Therefore, the resource pool with a larger criteria parameter is prior to be selected.

In block S322: the UE checks whether all the remaining resources from the first i resource pools meet the stopping criterion.

An initial value of i is 1.

When the remaining resources from the first i resource pools meet the stopping criterion, block S323 is performed. Otherwise, block S324 is performed.

In the block S323: the UE treats the first i resource pools as a candidate resource pool, and checks whether all the remaining resources of the candidate resource pool meet the stopping criterion.

The cardinality of the candidate resource pool is a current value of i.

In the block S324: the UE updates i by incrementing the current value of i by 1.

In block S325: the UE checks whether the updated i is greater than the total number of resource pools.

When the updated i is greater than the total number of the resource pools, it means that the stopping criterion isn't met when the candidate resource pool has included all the resource pools, block S326 will be performed. Otherwise, the block S322 is performed again.

In the block S326: the UE decides that all the remaining resources of the candidate resource pool don't meet the stopping criterion.

During the data transmission, the more carriers being used, the more parts a transmission power will be divided into, and the more power loss there is. In the embodiment, the UE can complete selecting the candidate resource pool and checking whether the stopping criterion is met at the same time, and the cardinality of the candidate resource pool is as small as possible. Compared with the fifth embodiment, although the calculation amount in the checking process increases, the cardinality of the candidate resource pool may be reduced, and the power loss is reduced.

The times to check whether all the remaining resources of the candidate resource pool meet the stopping criterion is greater than or equal to 1. The UE may select all the resource pools as the candidate resource pool or successively increase the candidate resource pool each time when checking whether all remaining resources of the candidate resource pool meet the stopping criterion.

Figure 7:
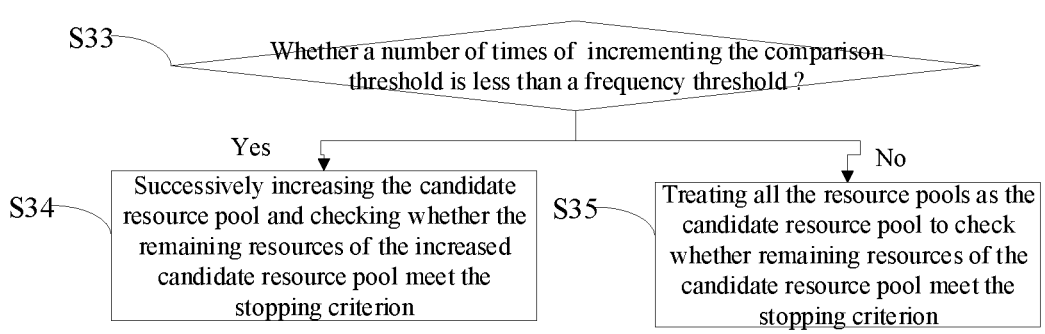
FIG. 7 illustrates a flow chart of determining whether the remaining resources of the resource pool meet a criterion for stopping resource exclusion in one embodiment of the present disclosure.

As shown in FIG. 7, in one embodiment of the present disclosure, the step that the UE checks whether the remaining resources of the candidate resource pool meet the stopping criterion may include the following blocks.

In block S33: the UE determines whether a number of times of incrementing the comparison threshold is less than a frequency threshold.

When the number of times of incrementing the comparison threshold is less than the frequency threshold, block S34 will be performed. Otherwise, block S35 will be performed.

In the block S34: the UE successively increases the candidate resource pool and checks whether the remaining resources of the increased candidate resource pool meet the stopping criterion.

In specific, the block S34 can be referred to what describes in the fifth embodiment.

In the block S35: the UE treats all the resource pools as the candidate resource pool to check whether remaining resources of the candidate resource pool meet the stopping criterion.

When the frequency threshold is less than or equal to 0, since the number of times of incrementing the comparison threshold is only an integer greater than or equal to 0, it means that a checking result of the block S33 will always be "no", and only the block S35 will be performed. In other words, the UE only treats all the resource pools as the candidate resource pool.

When the frequency threshold is positive infinity, it means that a checking result of the block S33 will always be "yes", and only the block S34 will be performed. In other word, the UE only successively increases the candidate resource pool.

When the frequency threshold is a finite value greater than 0, the block S34 will be performed several times and then the block S35 will be performed. For example, the frequency threshold is 1. The block S34 is first performed to increase the candidate resource pool, and the block S35 will be performed in the subsequent process to treat all the resource pools as the candidate resource pool.

In the embodiment, the UE first successively increases the candidate resource pool and then treats all the resource pools as the candidate resource pool. In other embodiments, the UE may also first treat all the resource pools as the candidate resource pool and then successively increase the candidate resource pool. For example, the corresponding relationship between the checking result of the block S33 and the next-performed block is reversed, or the relationship between the number of times of incrementing the comparison threshold and the frequency threshold in the block S33 is modified.

Different schemes formed by different forms of the block S33 will be described herein with the reference to drawings.

Figure 8:
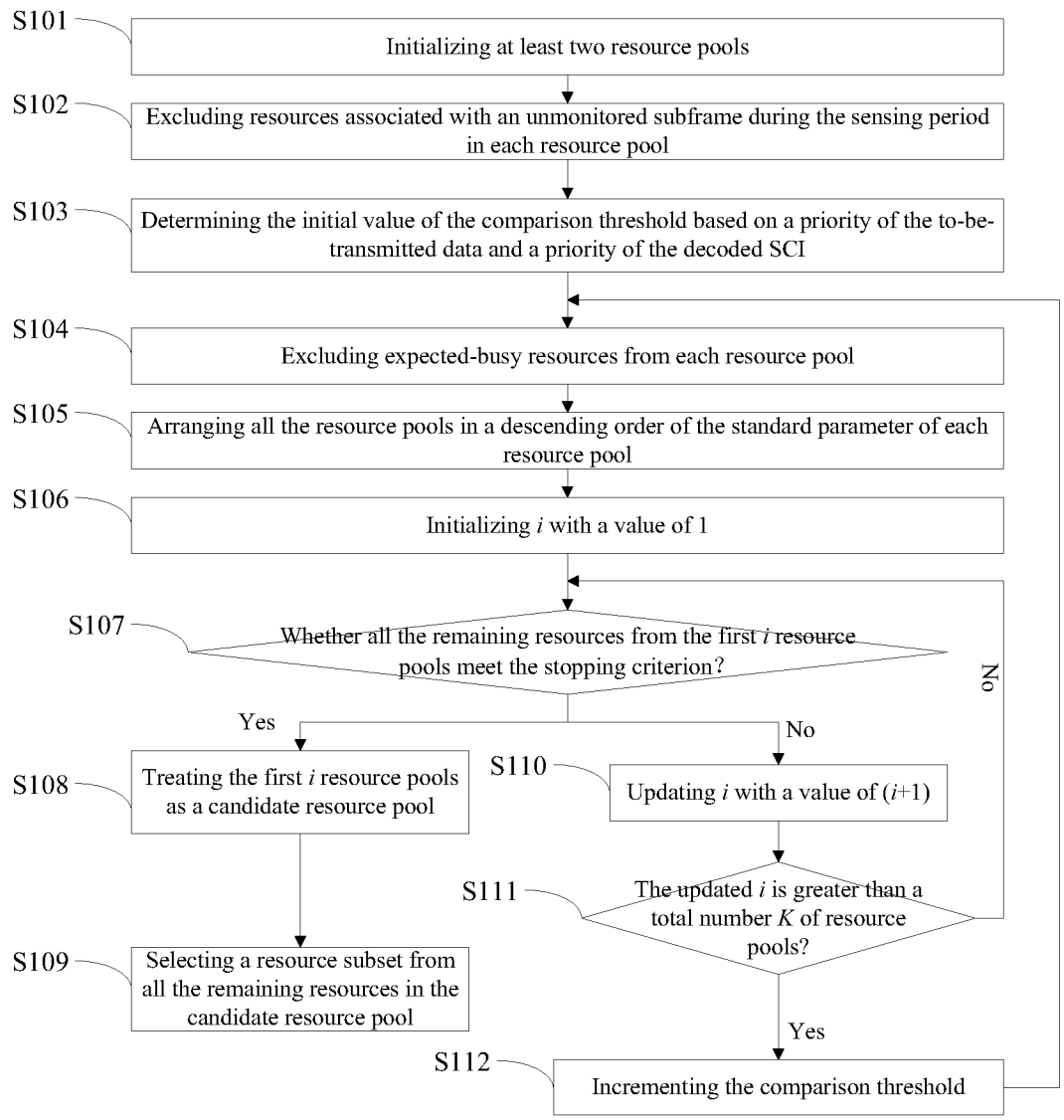
FIG. 8 illustrates a diagram of the scheme I for the resource selection method.

In scheme-I, the UE successively increases the candidate resource pool each time after performing the block S33. The same details with that in the aforementioned embodiments will not be described herein. As shown in FIG. 8, the scheme-I includes the following blocks.

In block S101: the UE initializes at least two resource pools.

In block S102: the UE excludes resources associated with an unmonitored subframe during the sensing period in each resource pool.

In block S103: the UE determines the initial value of the comparison threshold based on a priority of the to-be-transmitted data and a priority of the decoded SCI.

In block S104: the UE excludes expected-busy resources from each resource pool.

In block S105: the UE arranges all the resource pools in a descending order of the criteria parameter of each resource pool.

In block S106: the UE initializes i with a value of 1.

In block S107: the UE checks whether all the remaining resources from the first i resource pools meet the stopping criterion.

When the stopping criterion is met, block S108 will be performed. Otherwise block S110 will be performed.

In the block S108: the UE treats the first i resource pools as a candidate resource pool.

Then block S109 will be performed.

In the block S109: the UE selects a resource subset from all the remaining resources in the candidate resource pool. The process terminates.

In block S110: the UE updates i with a value of (i+1).

In block Sill: the UE determines whether the value of the updated i is greater than a total number K of resource pools.

When the value of the updated i is greater than the total number K, block S112 will be performed. Otherwise, block S107 will be performed.

In the block S112: the UE increments the comparison threshold.

Then the block S104 will be performed.

Figure 9:
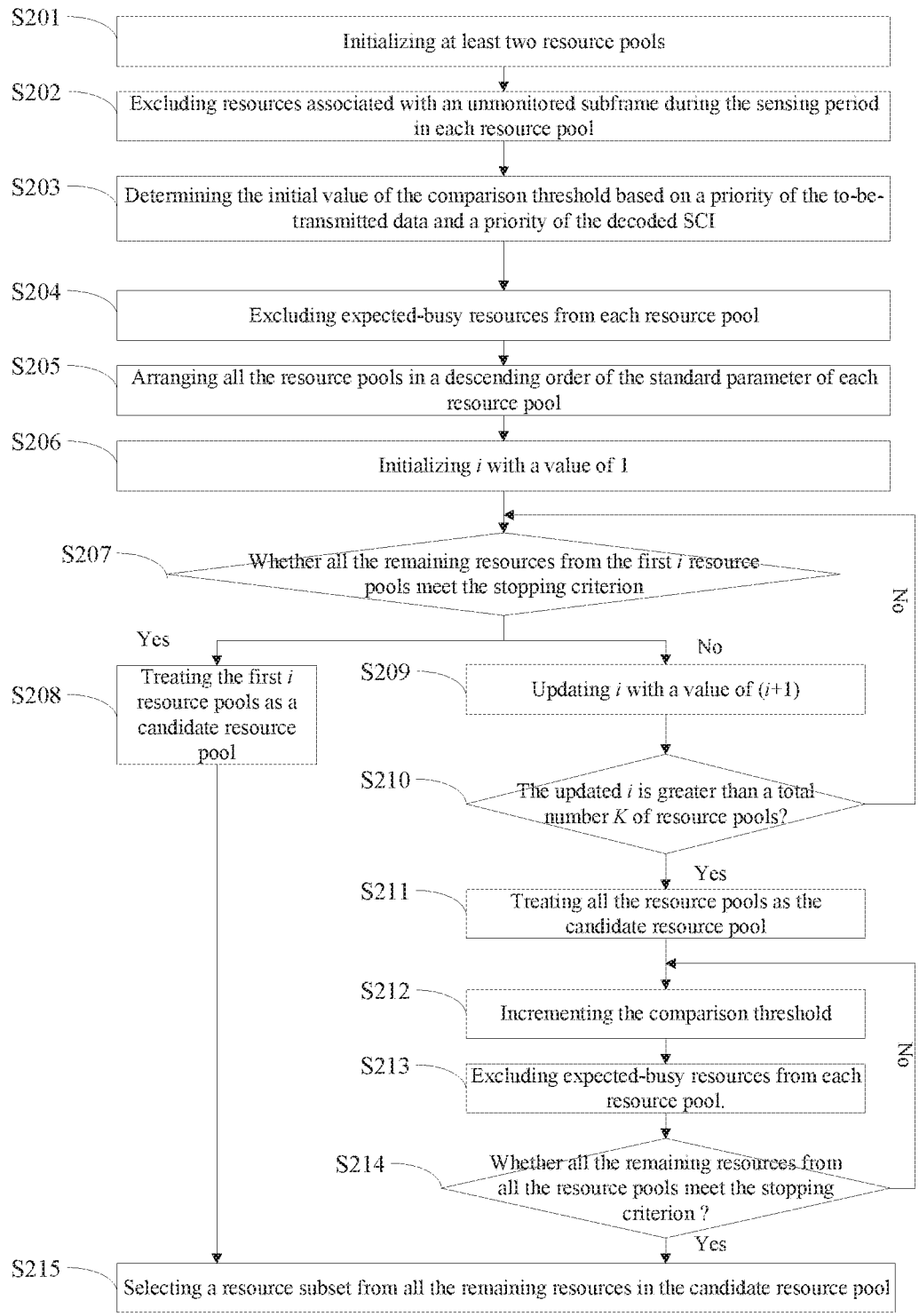
FIG. 9 illustrates a diagram of the scheme II for the resource selection method.

In scheme-II, the UE first successively increases the candidate resource pool and then always treats all the resource pools as the candidate resource pool in subsequent process. The same details with that in the aforementioned embodiments will not be described herein. As shown in FIG. 9, the scheme-II includes the following blocks.

In block S201: the UE initializes at least two resource pools.

In block S202: the UE excludes resources associated with an unmonitored subframe during the sensing period in each resource pool.

In block S203: the UE determines the initial value of the comparison threshold based on a priority of the to-be-transmitted data and a priority of the decoded SCI.

In block S204: the UE excludes expected-busy resources from each resource pool.

In block S205: the UE arranges all the resource pools in a descending order of the criteria parameter of each resource pool.

In block S206: the UE initializes i with a value of 1.

In block S207: the UE checks whether all the remaining resources from the first i resource pools meet the stopping criterion.

When the stopping criterion is met, block S208 will be performed. Otherwise block S209 will be performed.

In the block S208: the UE treats the first i resource pools as a candidate resource pool.

Then block S215 will be performed.

In block S209: the UE updates i with a value of (i+1).

In block S210: the UE determines whether the updated i is greater than a total number K of resource pools.

When i is greater than the total number K, block S211 will be performed. Otherwise, block S207 will be performed.

In the block S211: the UE treats all the resource pools as the candidate resource pool.

In the block S212: the UE increments the comparison threshold.

In block S213: the UE excludes expected-busy resources from each resource pool.

In block S214: the UE checks whether all the remaining resources from all the resource pools meet the stopping criterion.

When the stopping criterion is met, block S215 will be performed. Otherwise, the block S212 will be performed.

In the block S215: the UE selects a resource subset from all the remaining resources in the candidate resource pool. The process terminates.

Figure 10:
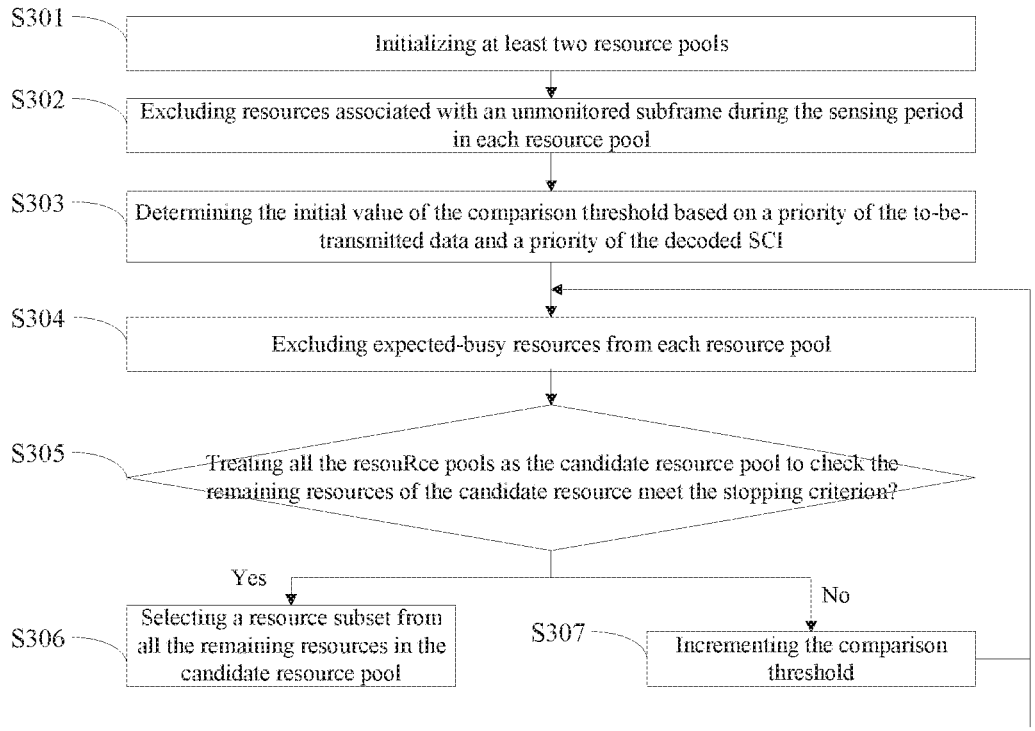
FIG. 10 illustrates a diagram of the scheme III for the resource selection method.

In scheme-III, the UE directly treats all the resource pools as the candidate resource pool each time after performing the block S33. The same details with that in the aforementioned embodiments will not be described herein. As shown in FIG. 10, the scheme-III includes the following blocks.

In block S301: the UE initializes at least two resource pools.

In block S302: the UE excludes resources associated with an unmonitored subframe during the sensing period in each resource pool.

In block S303: the UE determines the initial value of the comparison threshold based on a priority of the to-be-transmitted data and a priority of the decoded SCI.

In block S304: the UE excludes expected-busy resources from each resource pool.

In block S305: the UE treats all the resource pools as the candidate resource pool to check the remaining resources of the candidate resource meet the stopping criterion.

When the stopping criterion is met, block S306 will be performed. Otherwise block S307 will be performed.

In the block S306: the UE selects a resource subset from all the remaining resources in the candidate resource pool. The process ends.

In block S307: the UE increments the comparison threshold.

Then the block S304 will be performed.

An order of computing complexity of those schemes is scheme-I>scheme-II>scheme-III.

The above schemes are just schematic. In fact, the UE may also use other schemes based on a result of checking whether the stopping criterion is met.

In an example, the total numbers of resources of the resource pool for the carrier C, the resource pool for the carrier D and the resource pool of the carrier E are 100. The criteria parameters thereof are the numbers of the remaining resources of each resource pool. The preset threshold is 40 (which cannot be affected by the candidate resource pool). The numbers of the remaining resources for the carrier C, carrier D and carrier E are 10, 20, and 5 respectively in the case where the comparison threshold is the initial value. After the comparison threshold is incremented one time, the numbers of the remaining resources for the carrier C, carrier D and carrier E becomes 20, 25, and 10 respectively.

When the scheme-I is adopted, during the first checking process, the three resource pools are first arranged in an order of 20→10→5, then it is determined whether 20 is greater than or equal to 40 and the result is "no", it is then determined whether (20+10) is greater than or equal to 40 and the result is still "no", it is then determined whether (20+10+5) is greater than or equal to 40 and the result is still "no". As it can be seen, though all the three resource pools have been selected, the stopping criterion still isn't met. Then the comparison threshold needs to be incremented. Then during the second checking process, the three resource pools are first arranged in an order of 25→20→10, then it is determined whether 25 is greater than or equal to 40 and the result is "no", it is then determined whether (25+20) is greater than or equal to 40 and the result is "yes". Then the resource pools for the carrier C and the carrier D are treated as the candidate resource pool and the resource subset is selected from the candidate resource pool.

When the scheme-II is adopted, the first checking process is same with that in the scheme-I, and all the three resource pools are treated as the candidate resource pool at the same time the comparison threshold is decided to be incremented. During the second checking, it is directly determined whether (20+25+10) is greater than or equal to 40, and the result is "yes".

When the scheme-III is adopted, all the three resource pools are directly treated as the candidate resource pool. During the first checking process, the total number of all the remaining resource is calculated as 10+20+5=35<40, then the comparison threshold needs to be incremented. During the second checking process, the total number of all the remaining resource is calculated as 10+20+5=35<40, then the resource subset can be selected.

Figure 11:
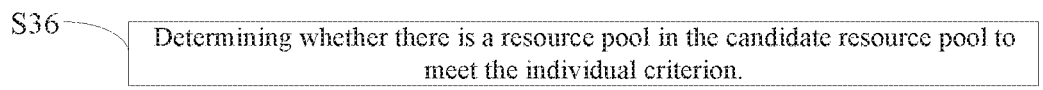
FIG. 11 illustrates a flow chart of a resource selection method for device-to-device/vehicle-to-everything communication supporting carrier aggregation according to a sixth embodiment of the present disclosure.

FIG. 11 is a flow chart of a resource selection method for device-to-device/vehicle-to-everything communication supporting carrier aggregation according to a sixth embodiment of the present disclosure, which is based on that in the first embodiment. In the embodiment, the stopping criterion further includes an individual criterion, and the block S3 further includes the following blocks.

In block S36: the UE determines whether there is a resource pool in the candidate resource pool to meet the individual criterion.

The individual criterion is that the criteria parameter of at least one resource pool from the candidate resource pool is greater than or equal to an individual threshold.

When the criteria parameter is a number of all the remaining resources of the candidate resource pool, and an individual threshold of the number is $N^{s0}$, the individual criterion is that there exists $k0 \in S$ such that $N_{k0} > N^{s0}$.

When the criteria parameter is an occupancy proportion of all the remaining resources of the candidate resource pool, and an individual threshold of the occupancy proportion is $r^{s1}$, the individual criterion is that there exists $k1 \in S$ such that $$\frac{N_{k1}}{M_{k1}} \geq r^{s1}.$$

The individual criterion may be directional, which is used for specifying one resource pool/one kind of resource pool. In other word, when the criteria parameter of one specified resource pool/kind of resource pool in the candidate resource pool is greater than or equal to an individual threshold, the individual criterion is met. The individual criterion may also used for all the resource pools.

When the individual criterion is directional, the individual criterions corresponding to resources pools in the candidate resource pool are not exactly same. That is to say, there exist at least two resource pools which correspond to the individual threshold are different.

The block S36 is independent from the block that checking whether the aforementioned overall criterion. In the embodiment, only the remaining resources of the candidate resource pool meet both the individual criterion and the overall criterion at the same time, the stopping criterion can be determined to be met.

Figure 12:
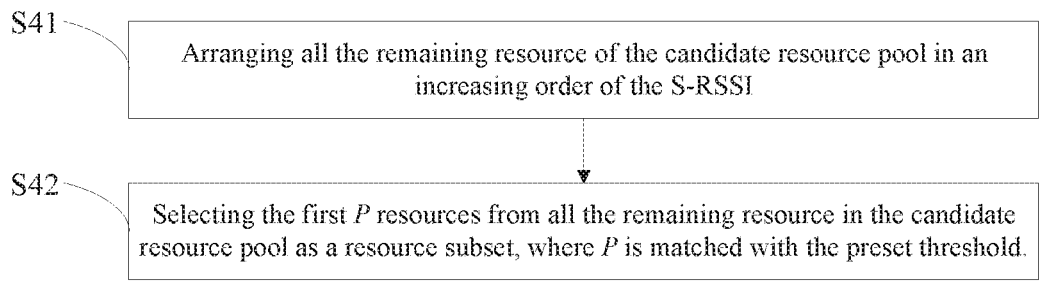
FIG. 12 illustrates a flow chart of a resource selection method for device-to-device/vehicle-to-everything communication supporting carrier aggregation according to a seventh embodiment of the present disclosure.

FIG. 12 is a flow chart of a resource selection method for device-to-device/vehicle-to-everything communication supporting carrier aggregation according to a seventh embodiment of the present disclosure, which is based on that in the first embodiment. In the embodiment, as shown in FIG. 12, the block S4 includes the following blocks.

In block S41: the UE arranges all the remaining resource of the candidate resource pool in ascending order of the S-RSSI.

Smaller the S-RSSI is, it means that smaller the load of the resource on the sidelink is.

In block S42: the UE selects the first P resources from all the remaining resource in the candidate resource pool as a resource subset, where P is matched with the preset threshold.

Specifically, when the criteria parameter is the number of all the remaining resource, P may be equal to a preset threshold of the number. When the criteria parameter is the occupancy proportion of all the remaining resources, P may be equal to a value obtaining by multiplying a preset threshold of the occupancy proportion by the total number of the resources in the candidate resource pool.

Since there probably exists a case where remaining resources of partial resource pools in the candidate resource pool are not selected into the resource subset, a number of corresponding carriers may be less than or equal to the base number of the candidate resource pool.

The scheme-I and scheme-II are simulated when they are applied on the V2X as follows. Simulation parameters are shown in table 1.

TABLE 1

| Road configuration | Freeway road |
| --- | --- |
| Number of lanes in the road | 3 in each direction |
| Land width | 4 m |
| Street length | 200 m |
| Vehicle UE speed | 70 km/h |
| Number of vehicle UEs | 21 |
| Carrier number | 8 |
| Bandwidth of each resource block (RB) | 180 kHz |
| Number of RBs per sub-channel | 2 |
| Number of sub-channels per resource | 2 |
| Noise power spectral density | −174 dBm/Hz |
| UE noise figure | 9 dB |
| UE transmission power | 23 dBm |
| Antenna gain | 3 dBi |
| Resource pool parameters [c d] | [4, 50] ms |
| Priority of data packet for target UE | 4 |

TABLE 1-continued

| Priority of data packet for other UEs | Random integer between 1 and 8 |
| --- | --- |
| Periodicity for SPS | 100 ms |
| Number of resources to be selected | 10 |
| Minimum required remaining resource ratio | 20% |

Figure 13:
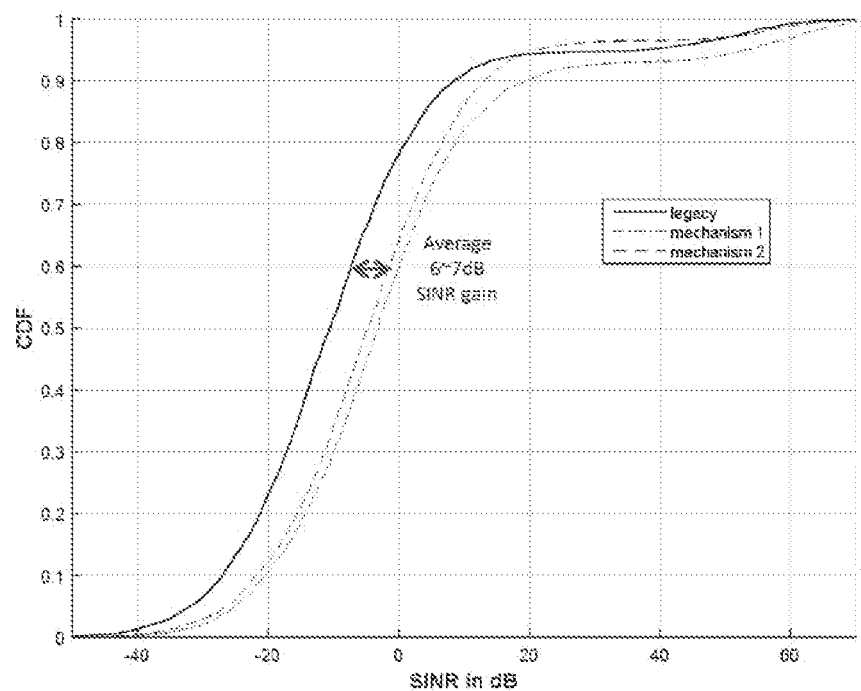
FIG. 13 illustrates a diagram of a cumulative distribution function of SINR simulated by the resource selection method for device-to-device/vehicle-to-everything communication supporting carrier aggregation.

A scheme that a resource selection method in the prior art is respectively applied to each carrier is used as a comparison scheme. During the simulation, for each scheme, one vehicle UE is treated as a transmitter which transmits a UE packet while other UEs are used as receivers receiving the UE packet. One receiver measures SINR, and the cumulative distribution function (CDF) of the SINR is shown in FIG. 13. As it can be seen, compared with the comparison scheme, both the scheme-I and scheme-II averagely have about 6~7 dB SINR gain.

Figure 14:
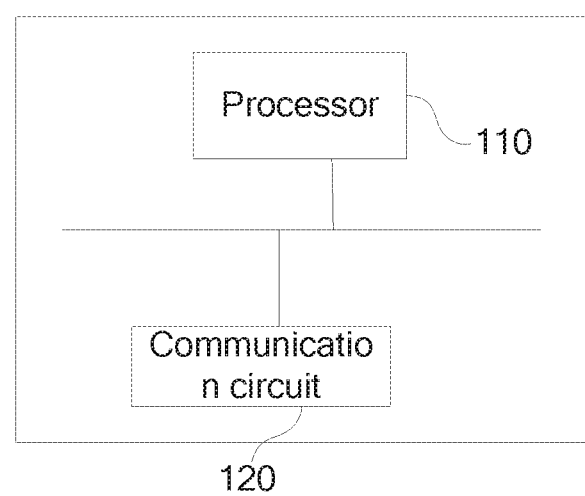
FIG. 14 illustrates a schematic view of a resource selection apparatus for device-to-device/vehicle-to-everything communication supporting carrier aggregation according to a first embodiment of the present disclosure.

FIG. 14 is schematic view of a resource selection apparatus for device-to-device/vehicle-to-everything communication supporting carrier aggregation according to a first embodiment of the present disclosure. As shown in FIG. 14, the resource selection apparatus includes a processor 110 and a communication circuit 120. The processor 110 may be connected to the communication circuit 120.

The communication circuit 120 may be configured for transmitting and receiving data, which is an interface for communication between the resource selection apparatus and other communication devices.

The processor 110 controls operations of the resource selection apparatus. The processor 110 may also be called as the Central Processing Unit (CPU). The processor 110 may be an integrated circuit chip with an ability to process signals. The processor 110 may also be a common processor, a Digital Signal Processor (DSP), an Application Specific Integrated Circuits (ASIC), a Field Programmable Gate Array (FPGA) or another programmable logical device, a discrete gate or transistor logic component, a discrete hardware component. The common processor may be a microprocessor, or also be any one of conventional processors, etc.

The processor 110 may be configured for performing programs to achieve any one of the resource selection methods for device-to-device/vehicle-to-everything communication supporting carrier aggregation in accordance with the first to seventh embodiment or a method provided with arbitrary and non-conflicting combination of the resource selection methods therein.

Figure 15:
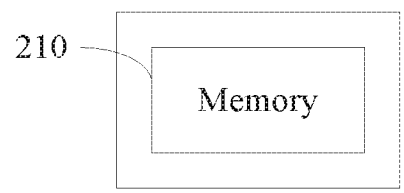
FIG. 15 illustrates a schematic view of a resource selection apparatus for device-to-device/vehicle-to-everything communication supporting carrier aggregation according to a second embodiment of the present disclosure.

FIG. 15 is schematic view of a resource selection apparatus for device-to-device/vehicle-to-everything communication supporting carrier aggregation according to a second embodiment of the present disclosure. As shown in FIG. 15, the resource selection apparatus includes a memory 210. The memory 210 is used to store instructions therein. When the instructions are performed, any one of the resource selection methods for device-to-device/vehicle-to-everything communication supporting carrier aggregation in accordance with the first to seventh embodiment or a method provided with arbitrary and non-conflicting combination of the resource selection methods therein may be achieved. The memory 210 may include a Read-Only Memory (ROM), a Random Access Memory (RAM), a Flash Memory, hard disk, optical disk, etc.

The functions of each part of each resource selection apparatus and the feasible expansion can be referred to the description of the corresponding method for beam management according to embodiments of the present disclosure, and be no longer repeated to describe herein.

The above description depicts merely some exemplary embodiments of the disclosure, but is meant to limit the scope of the disclosure. Any equivalent structure or flow transformations made to the disclosure, or any direct or indirect applications of the disclosure on other related fields, shall all be covered within the protection of the disclosure.

What is claimed is:

1. A resource selection method for device-to-device/vehicle-to-everything communication supporting carrier aggregation, comprising:
   initializing at least two resource pools, wherein each resource pool corresponds to one carrier;
   excluding an expected-busy resource from each resource pool associated with a resource of which channel signal strength is greater than a comparison threshold during a sensing period;
   determining whether remaining resources of a candidate resource pool meet a criterion for stopping resource exclusion, wherein the candidate resource pool comprises a portion of or all the resource pools, and the criterion comprises that a criteria parameter of the candidate resource pool is greater than or equal to a preset threshold of the criteria parameter; and
   selecting a resource subset from the remaining resources of the candidate resource pool when the criterion is met, and otherwise incrementing the comparison threshold to repeatedly execute the excluding the expected-busy resources from each resource pool and the determining whether the remaining resources of the candidate resource pool meet the criterion;
   wherein the determining whether the remaining resources of the candidate resource pool meet the criterion for stopping resource exclusion comprises:
   successively expanding the candidate resource pool by increasing, in all the resource pools, a number of resource pools that are treated as the candidate resource pool, and determining whether the remaining resources of the expanded candidate resource pool meet the criterion for stopping resource exclusion when a number of times of incrementing the comparison threshold is less than a frequency threshold; and
   treating all the resource pools as the candidate resource pool to determine whether all the remaining resources of the candidate resource pool meet the criterion when the number of times of incrementing the comparison threshold is not less than the frequency threshold.

2. The method of claim 1, wherein the successively increasing the candidate resource pool and determining whether the remaining resources of the increased candidate resource pool meet the criterion comprises:
   arranging all the resource pools in a descending order of the criteria parameter;
   determining whether remaining resources of the first i resource pools in the descending order meet the criterion for stopping resource exclusion, wherein an initial value of the i is 1; and
   treating the first i resource pools as the candidate resource pool and deciding that the remaining resources of the candidate resource pool meet the criterion when the criterion is met, otherwise updating a value of the i by incrementing a current value of the i by 1, and determining whether the value of the updated i is greater than a total number of the resource pools; and
   deciding that the remaining resources of the candidate resource pool don't meet the criterion when the value of the updated i is greater than the total number of the resource pools, and otherwise repeatedly executing determine whether the remaining resources of the first updated i resource pools in the descending order meet the criterion.

3. The method of claim 1, wherein the frequency threshold is 0, positive infinity or a value greater than 0.

4. The method of claim 1, wherein the criterion further comprises resource-pool-associated criterion comprising that criteria parameter of at least one resource pool is greater than or equal to resource-pool-associated threshold; and
   the determining whether the remaining resources of the candidate resource pool meet the criterion further comprises:
   determining whether there is a resource pool meeting the resource-pool-associated criterion in the candidate resource pool.

5. The method of claim 4, wherein at least two resource pools from the candidate resource pool correspond to different resource-pool-associated thresholds.

6. The method of claim 1, wherein the criteria parameter is a number and/or occupancy proportion of the remaining resources in a corresponding resource pool set, the occupancy proportion of the remaining resources is a ratio between the number of the remaining resources and a total number of the resources in the corresponding resource pool set, and the corresponding resource pool set comprises at least one resource pool.

7. The method of claim 6, wherein when the criteria parameter is the number of the remaining resources in the corresponding resource pool set, the preset threshold of the criteria parameter is 20% of a sum of a total number of all the initialized resource pools.

8. The method of claim 1, wherein the preset threshold varies as a number of resource pools from the candidate resource pool varies.

9. The method of claim 1, further comprising before excluding the expected-busy resource from each resource pool:
   excluding a resource associated with an unmonitored subframe from each resource pool in the sensing period.

10. The method of claim 1, further comprising before excluding the expected-busy resource from each resource pool:
    determining an initial value of the comparison threshold according to a priority for to-be-transmitted data and a priority for decoded side-link control information.

11. The method of claim 1, wherein the channel signal strength comprises a reference signal received power of a physical sidelink control channel (PSCCH).

12. The method of claim 1, wherein a single increment value of the comparison threshold is 3 dB.

13. The method of claim 1, wherein time windows corresponding to at least two of the resource pools have a same endpoint.

14. The method of claim 1, wherein the selecting the resource subset from the remaining resources of the candidate resource pool comprises:
    arranging the remaining resources of the candidate resource pool in ascending order of a side-link received signal strength indicator (S-RSSI);
    treating the first P resources from the remaining resources of the candidate resource pool in the ascending order as the resource subset, wherein P is a number of resources, and P is determined based on the preset threshold.

15. The method of claim 14, wherein when the criteria parameter is a number of the remaining resources in a corresponding resource pool set, P is equal to a threshold number of resources represented by the preset threshold;
- or when the criteria parameter is an occupancy proportion of the remaining resources in the corresponding resource pool set, P is equal to a value obtained by multiplying the occupancy proportion by the total number of resources from the candidate resource pool.

16. The method of claim 1, wherein the resource subset is configured for supporting sidelink transmission in device-to-device/vehicle-to-everything system supporting carrier aggregation.

17. A resource selection apparatus for device-to-device/vehicle-to-everything communication supporting carrier aggregation, comprising a processor and a communication circuit, wherein the processor is connected to the communication circuit, and the processor is configured for executing programs to perform the method as claimed in claim 1.

18. A resource selection apparatus for device-to-device/vehicle-to-everything communication supporting carrier aggregation, comprising:
- a memory storing programs; and
- a processor configured to execute the programs, to perform the method as claimed in claim 1.

* * * * *